(12) United States Patent
Li et al.

(10) Patent No.: US 11,616,575 B2
(45) Date of Patent: Mar. 28, 2023

(54) OPTICAL MODULE

(71) Applicant: HISENSE BROADBAND MULTIMEDIA TECHNOLOGIES CO., LTD., Shandong (CN)

(72) Inventors: Dan Li, Shandong (CN); Guangchao Du, Shandong (CN); Yongzheng Tang, Shandong (CN); Qinhao Fu, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 320 days.

(21) Appl. No.: 16/911,897

(22) Filed: Jun. 25, 2020

(65) Prior Publication Data

US 2020/0328815 A1   Oct. 15, 2020

Related U.S. Application Data

(63) Continuation-in-part of application No. PCT/CN2019/095453, filed on Jul. 10, 2019.

(30) Foreign Application Priority Data

Aug. 8, 2018   (CN) .......................... 201810898143.7
Aug. 9, 2018   (CN) .......................... 201810905077.1

(51) Int. Cl.
*H04B 10/40* (2013.01)
*G01J 1/04* (2006.01)
(Continued)

(52) U.S. Cl.
CPC ............ *H04B 10/40* (2013.01); *G01J 1/0477* (2013.01); *H04B 10/503* (2013.01); *H04B 10/615* (2013.01); *H04J 14/02* (2013.01)

(58) Field of Classification Search
CPC .... H04B 10/40; H04B 10/503; H04B 10/615; H04B 10/1143; H04B 10/50; H04B 10/61;
(Continued)

(56) References Cited

U.S. PATENT DOCUMENTS 6,901,221 B1    5/2005 Jiang et al.
2015/0256259 A1*  9/2015 Huang ................ H04B 10/506
                                                                398/139
(Continued)

FOREIGN PATENT DOCUMENTS

CN       105759371 A    7/2016
CN       103744145 B    8/2016
(Continued)

OTHER PUBLICATIONS

International Search Report and Written Opinion issued in corresponding International Application No. PCT/CN2019/095453 dated Sep. 27, 2019, with English translation.
(Continued)

*Primary Examiner* — Hibret A Woldekidan
(74) *Attorney, Agent, or Firm* — Morgan, Lewis & Bockius LLP

(57) ABSTRACT

An optical module includes: a casing; a printed circuit board (PCB) connected to a first side wall of the casing and configured to provide first electrical signals to an optical transmitter assembly; the optical transmitter assembly
(Continued)

arranged in the casing and configured to convert the first electrical signals into first optical signals; an optical receiver adapter and an optical transmitter adapter arranged outside the casing and connected to a second side wall of the casing, wherein the optical transmitter adapter is configured to receive second optical signals; a first displacement prism arranged in the casing and configured to direct the second optical signals toward an optical receiver assembly; and the optical receiver assembly configured to convert the second optical signals into second electrical signals. At least one component of the optical receiver assembly is arranged in the casing.

18 Claims, 7 Drawing Sheets

(51) Int. Cl.
  *H04B 10/50* (2013.01)
  *H04B 10/61* (2013.01)
  *H04J 14/02* (2006.01)
(58) Field of Classification Search
  CPC ........ H04B 10/43; G01J 1/0477; H04J 14/02; G02B 27/30; G02B 6/425; G02B 6/4204; G02B 6/42; G02B 6/26; G02B 6/34; G02B 6/32; G02B 6/4246; G02B 26/08; H05K 13/00
  USPC .................................. 398/135–139; 250/216
  See application file for complete search history.

(56) References Cited

U.S. PATENT DOCUMENTS

2015/0304053 A1* 10/2015 Pfnuer ................. G02B 6/4215
  398/212
2016/0191166 A1* 6/2016 Wang ....................... G02B 6/42
  398/135

FOREIGN PATENT DOCUMENTS

| CN | 107045166 A | 8/2017 | |
|---|---|---|---|
| CN | 108873197 A | 11/2018 | |
| CN | 108919435 A | 11/2018 | |
| WO | WO-2017118271 A1 * | 7/2017 | ............... G02B 6/42 |

OTHER PUBLICATIONS

First Office Action issued in corresponding Chinese Patent Application No. 201810898143.7 dated Apr. 22, 2019, with English translation.
Second Office Action issued in corresponding Chinese Patent Application No. 201810898143.7 dated Oct. 25, 2019, with English translation.
Third Office Action issued in corresponding Chinese Patent Application No. 201810898143.7 dated Apr. 8, 2020, with English translation.
First Office Action issued in corresponding Chinese Patent Application No. 201810905077.1 dated Apr. 19, 2019, with English translation.
Second Office Action issued in corresponding Chinese Patent Application No. 201810905077.1 dated Oct. 25, 2019, with English translation.

* cited by examiner

OPTICAL MODULE

CROSS-REFERENCE TO RELATED APPLICATIONS

This application is a Bypass Continuation-in-Part application of PCT/CN2019/095453 filed on Jul. 10, 2019, which claims priorities to Chinese Patent Applications No. 201810898143.7 filed on Aug. 8, 2018 and No. 201810905077.1 filed on Aug. 9, 2018, the entire of each is incorporated herein by reference.

TECHNICAL FIELD

Embodiments of the present disclosure relates to an optical module.

BACKGROUND

In the field of optical communications, optical modules are important devices for photoelectric conversion. The optical module usually includes an optical receiver, an optical transmitter and a printed circuit board (PCB). The optical receiver and the optical transmitter can be independently arranged on the PCB, and the PCB is provided with electronic components thereon. The optical receiver and the optical transmitter are electrically connected to the electronic components.

SUMMARY

In a first aspect, an optical module is provided. The optical module includes a casing, a PCB, an optical transmitter assembly, an optical receiver adapter, an optical transmitter adapter, a first displacement prism and an optical receiver assembly. The PCB is connected to a first side wall of the casing, and is configured to provide a plurality of first electrical signals to the optical transmitter assembly. The optical transmitter assembly is disposed in the casing, and is configured to convert the plurality of first electrical signals into first optical signals. The optical receiver adapter and the optical transmitter adapter are arranged outside the casing, and are connected to a second side wall of the casing. The optical transmitter adapter is configured to output the first optical signal. The optical receiver adapter is configured to receive second optical signals. The first displacement prism is disposed in the casing, and is configured to direct the second optical signals to an optical receiver assembly. At least one component of the optical receiver assembly is arranged in the casing, and is configured to convert the second optical signals into a plurality of second electrical signals.

BRIEF DESCRIPTION OF THE DRAWINGS

The technical solutions in the embodiments of the present disclosure will be described clearly and completely with reference to the accompanying drawings in the embodiments of the present disclosure. However, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

DETAILED DESCRIPTION

The technical solutions in the embodiments of the present disclosure will be clearly and completely described hereafter in combination with accompanying drawings. However, the described embodiments are merely some but not all embodiments of the present disclosure. All other embodiments obtained on the basis of embodiments of the present disclosure by those of ordinary skill in the art without inventive effort shall be within the scope of the present disclosure.

Unless the context requires otherwise, terms "comprise", "include" and other forms thereof such as the third-person singular forms "comprises", "includes" and the present participle forms "comprising" and "including" in the description and the claims are construed as an open and inclusive meaning, i.e., "included, but not limited to". In the description, terms such as "one embodiment", "some embodiments", "exemplary embodiments", "example", "some examples", or "specific example" are intended to indicate that specific features, structures, materials or characteristics related to the embodiment(s) or the example(s) are included in at least one embodiment or example of the present disclosure. Schematic representations of the above terms do not necessarily refer to the same embodiment(s) or example(s). In addition, the specific features, structures, materials or characteristics may be included in any or more embodiments/examples in any suitable manner.

Terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, a term "a plurality of" means two or more unless otherwise specified.

Exemplary embodiments are described herein with reference to sectional views and/or plan views as idealized exemplary drawings. Accordingly, variations in shape relative to the drawings due to, for example, manufacturing techniques and/or tolerances may be envisaged. Therefore, exemplary embodiments should not be construed as being limited to the shapes of the regions shown herein, but include deviations in shape due to, for example, manufacturing.

In addition, unless otherwise indicated, the terms such as "front", "rear", "left", "right", "upper", "lower", and the like are only for ease of description, and are not limited to one location or one spatial orientation.

Figure 1:
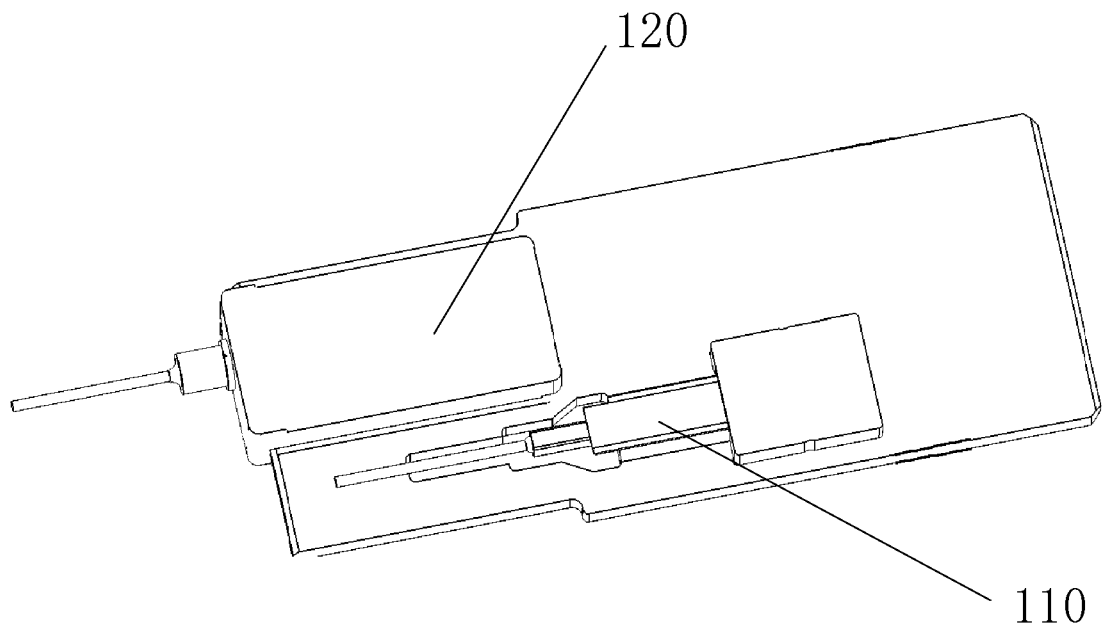
FIG. 1 illustrates a schematic diagram of a partial structure of an optical module in the related art.

In the related art, as shown in FIG. 1, the optical module includes a first casing 110 for receiving components of the optical receiver and a second casing 120 for receiving components of the optical transmitter. The first casing 110 and the second casing 120 can protect the components of the optical receiver and the optical transmitter from damage, respectively. However, the space inside the first casing 110 and the space inside the second casing 120 are relatively narrow, so it is relatively difficult to arrange the components of the optical receiver and the optical transmitter in the first casing 110 and the second casing 120, respectively.

Figure 2:
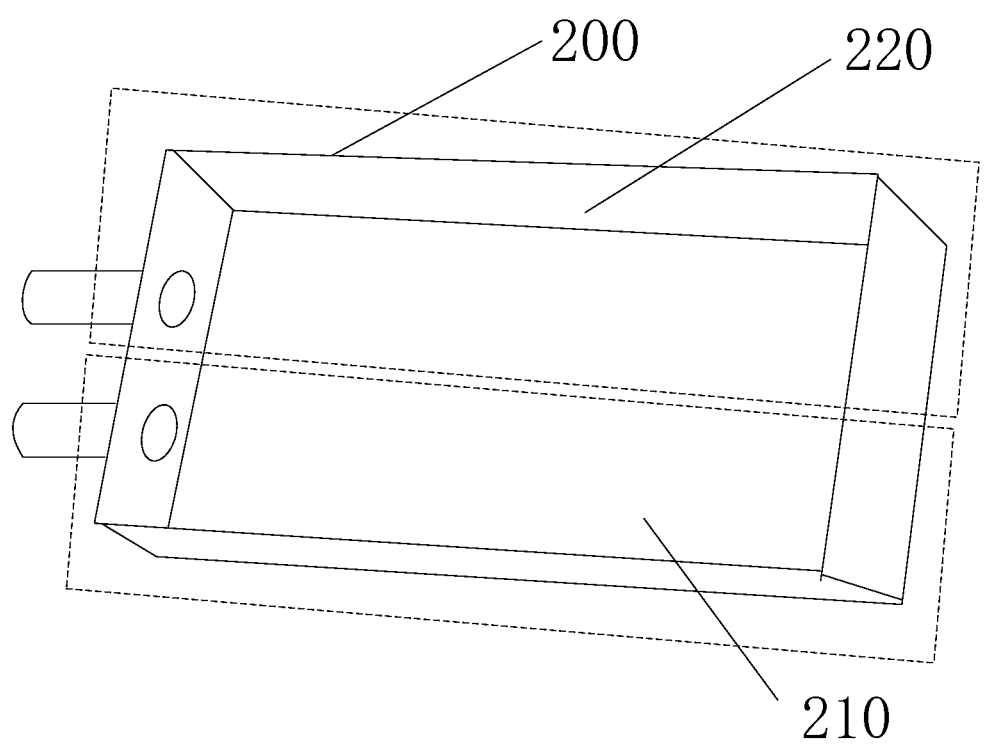
FIG. 2 illustrates a schematic diagram of a casing for receiving both an optical receiver and an optical transmitter, in accordance with some embodiments.

As shown in FIG. 2, the optical module includes one casing 200 instead of the first casing 110 and the second casing 120. The casing 200 has a chamber therein, and the chamber may be functionally divided into a first chamber 210 for receiving the components of the optical receiver and a second chamber 220 for receiving the components of the optical transmitter. In this way, since the components of the optical receiver and the optical transmitter are arranged in the same casing 200, it may be relatively easy to arrange the components of the optical receiver and the optical transmitter.

In some embodiments of the present disclosure, an optical module is provided. Referring to FIGS. 3 to 7, the optical module includes a casing 1, a printed circuit board (PCB) 2, an optical receiver adapter 3 and an optical transmitter adapter 4.

Figure 3:
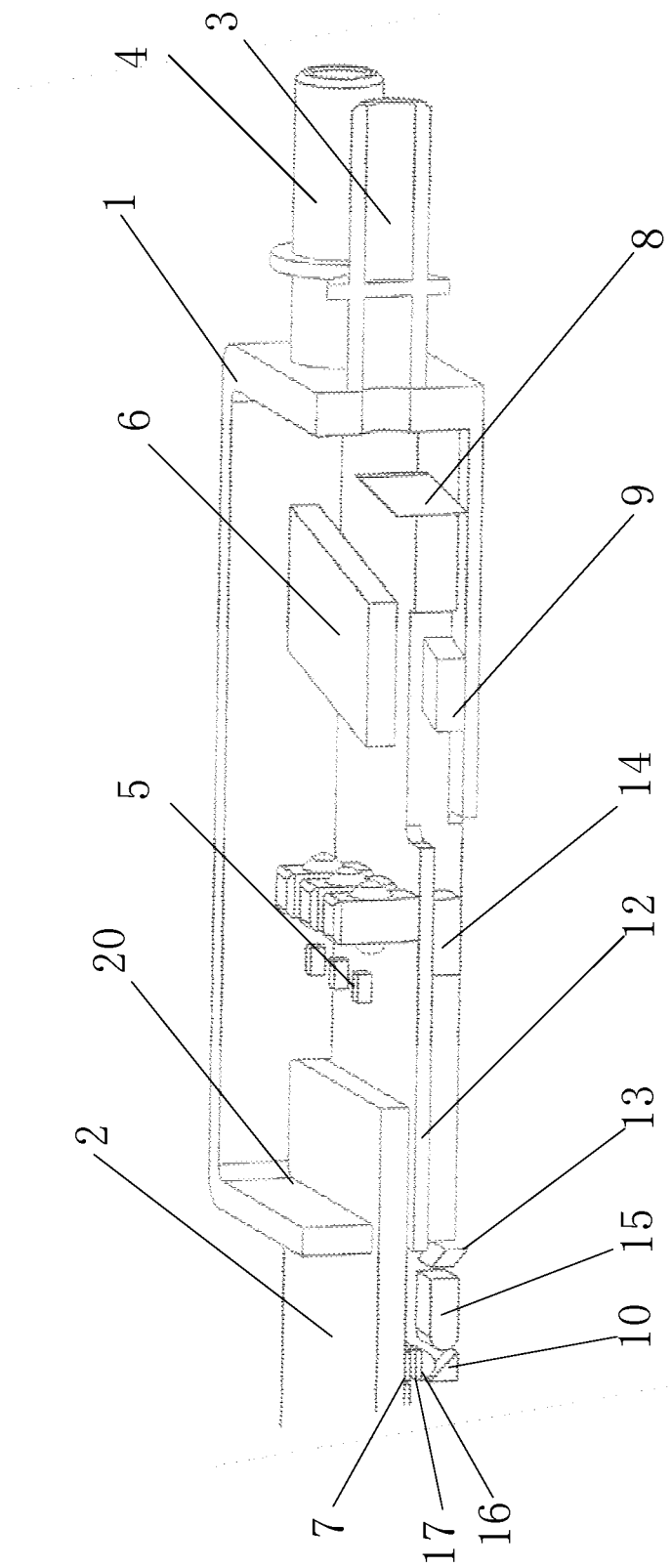
FIG. 3 illustrates a sectional view of a partial structure of an optical module, in accordance with some embodiments.

The PCB 2 is connected to a first side wall of the casing 1. For example, as shown in FIG. 3, one end of the PCB 2 extends into the casing 1 through a first side wall of the casing 1. The PCB 2 usually includes a base substrate, circuit traces on the base substrate, and pads on the base substrate. In addition, electronic components are provided on the base substrate through the pads, and the circuit traces are connected to the electronic components, for transmitting electrical signals. The electronic components on the PCB 2 include, for example, microcontroller unit (MCU), transistor, capacitor, etc.

The optical receiver adapter 3 and the optical transmitter adapter 4 are provided outside the casing 1, and are connected to a second side wall of the casing 1. In some examples, the first side wall is opposite to the second side wall. For example, the first side wall is the left side wall in FIG. 3, and the second side wall is the right side wall in FIG. 3. In some other examples, the first side wall is adjacent to and connected to the second side wall. For example, the first side wall is the left side wall in FIG. 3, and the second side wall is the rear side wall in FIG. 3.

As shown in FIG. 3, the optical module may further include two adjusting sleeves, one of which is used for connecting the optical receiver adapter 3 to the second side wall, and another one of which is used for connecting the optical transmitter adapter 4 to the second side wall. The second side wall has two openings corresponding to the two adjusting sleeves respectively to allow optical signals from the adjusting sleeves to pass through. For example, one end of an adjusting sleeve is connected to the optical receiver adapter 3 by full penetration welding, and the other end of the adjusting sleeve is fixed to the second side wall of the casing 1 by back welding. An end of another adjusting sleeve is connected to the optical transmitter adapter 4 by full penetration welding, and the other end of the another adjusting sleeve is fixed to the second side wall of the casing 1 by back welding.

As shown in FIG. 3, the optical module further includes an optical transmitter assembly and an optical receiver assembly. The optical transmitter assembly is disposed in the casing 1, and includes, for example, a laser array 5 and an optical multiplexer 6. At least one component of the optical receiver assembly is provided outside the casing 1. For example, the optical receiver assembly includes an optical receiver array 7 disposed outside the casing 1, and an optical demultiplexer 9 disposed inside the casing 1.

In the optical module, as shown in FIG. 3, the PCB 2 is configured to provide a plurality of first electrical signals to the optical transmitter assembly. For example, the circuit traces in the PCB 2 transmit the plurality of first electrical signals from the electronic components, such as the MCU, to the optical transmitter assembly. The optical transmitter assembly is configured to convert the plurality of first electrical signals into first optical signals. The optical transmitter adapter 4 is configured to output the first optical signals. The optical receiver adapter 3 is configured to receive second optical signals, and the optical receiver assembly is configured to convert the second optical signals into a plurality of second electrical signals.

It will be noted that the first optical signals may be optical signals with different wavelengths. In addition, the second optical signals may be optical signals with different wavelengths, and the second electrical signals may be electrical signals output from the optical receiver assembly to at least one electronic component on the PCB 2.

In order to avoid the crosstalk between the components of the optical receiver assembly and the optical receiver assembly located in the casing 1, as shown in FIG. 3, the optical module further includes a first displacement prism 8 disposed in the casing 1, and the first displacement prism 8 is configured to direct the second optical signals from the optical receiver adapter 3 toward the optical receiver assembly. For example, as shown in FIG. 3, the optical receiver adapter 3 may be located higher than the optical receiver assembly, and the first displacement prism 8 may direct the second optical signals from the optical receiver adapter 3 to the optical receiver assembly. After the second optical signals pass through the first displacement prism 8, the exit direction of the second optical signals may be the same as the incident direction of the second optical signals when they enter the first displacement prism 8.

Figure 4:
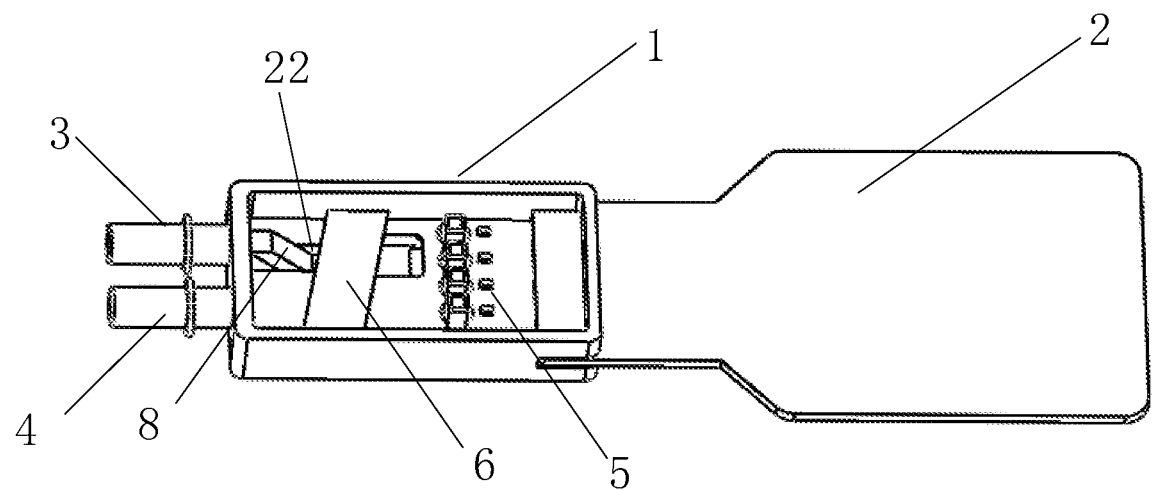
FIG. 4 illustrates a perspective view of a partial structure of an optical module, in accordance with some embodiments.

In some examples, as shown in FIG. 3, the optical module further includes a partition 12, such as a board or a plate, disposed in the casing 1. The partition 12 and the casing 1 can be integrally formed. The partition 12 divides the space in the casing 1 into a first chamber and a second chamber. The optical transmitter assembly including, for example, the laser array 5 and the optical multiplexer 6, is disposed in the first chamber. For example, the laser array 5 and the optical multiplexer 6 are fixedly arranged on the partition 12. The at least one component of the optical receiver assembly, for example, the optical demultiplexer 9, is disposed in the second chamber. The optical receiver adapter 3 and the optical transmitter adapter 4 are connected to the second side wall at positions corresponding to the first chamber. As shown in FIGS. 3 and 4, the partition 12 has a first opening 22 communicating with the first chamber and the second chamber, and the first displacement prism 8 extends from the first chamber to the second chamber through the first opening 22 and is fixedly arranged.

In some examples, as shown in FIG. 3, the first side wall of the casing 1 has a second opening 20. One end of the PCB 2 extends into the first chamber through the second opening 20, and an opposite end of the PCB 2 is located outside the casing 1. The PCB 2 is fixed in the second opening 20, for example. It will be noted that, in the embodiments of the present disclosure, only one end of the PCB 2 is embedded into the casing 1, and the width of the end of the PCB 2 embedded into the casing 1 is less than or equal to the width of the first side wall of the casing 1. In this case, as shown in FIG. 4, the first opening 22 may be arranged at another end of the partition 12 opposite to the second opening 20.

In some example, as shown in FIGS. 3 and 4, a plane where an intersection between a central axis (e.g., a longitudinal axis) of the optical receiver adapter 3 and the second side wall of the casing 1 and an intersection between a central axis (e.g., a longitudinal axis) of the optical transmitter adapter 4 and the second side wall of the casing 1 are located is parallel to a plane where the PCB 2 is located. For example, as shown in FIG. 3, the optical receiver adapter 3 is positioned to be as high as the optical transmitter adapter 4, with reference to, for example, the plane where the PCB 2 is located, and they are arranged at positions corresponding to the first chamber.

In the case where the partition 12 is provided in the casing 1, referring to FIG. 4, the laser array 5 may include a plurality of lasers, and the plurality of lasers receive a plurality of first electrical signals transmitted through at least one electronic component on the PCB 2 from a user terminal, respectively, and convert the received first electrical signals into first multi-path optical signals with different wavelengths, which are then focused by transmitter end lenses of the laser array 5 located between the lasers and the optical multiplexer 6 and enter the optical multiplexer 6. The optical multiplexer 6 combines the focused first multi-path optical signals and transmits them to the optical transmitter adapter 4.

In addition, referring to FIGS. 3 and 4, the optical receiver adapter 3 receives second optical signals with different wavelengths. The first displacement prism 8 directs the second optical signals to the optical demultiplexer 9, and the optical demultiplexer 9 separates the second optical signals to individual second optical signals, i.e., second multi-path second optical signals, each having wavelengths in a preset wavelength range. The preset wavelength range may be set according to actual needs or the parameters of the optical demultiplexer 9. The optical receiver array 7 may include a plurality of optical receivers, and the plurality of optical receivers convert the second multi-path optical signals into second electrical signals, respectively.

In some examples, a light inlet surface of the first displacement prism 8 faces light outlet end of the optical receiver adapter 3, and a light outlet surface of the first displacement prism 8 faces a light inlet surface of the optical demultiplexer 9. The second optical signals exit the first displacement prism 8 after being transmitted by the first displacement prism 8 and are incident onto the light inlet surface of the optical demultiplexer 9.

Figure 7:
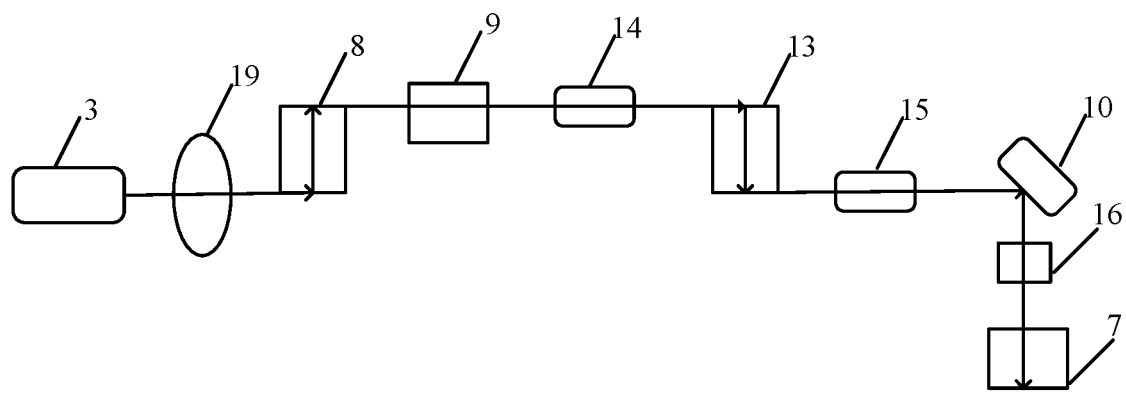
FIG. 7 illustrates an optical path diagram of an optical module when receiving an optical signal, in accordance with some embodiments.

The second optical signals from the optical receiver adapter 3 may be dispersed. In some examples, as shown in FIG. 7, the optical module further includes a collimating lens 19 disposed between the optical receiver adapter 3 and the first displacement prism 8. The collimating lens 19 may be embedded in the second side wall of the casing 1, and the light inlet surface and the light outlet surface of the collimating lens 19 respectively face the light outlet end of the optical receiver adapter 3 and the light inlet surface of the first displacement prism 8. For example, the light inlet surface of the collimating lens 19 faces the channel of the adjusting sleeve connected to the optical receiver adapter 3. The collimating lens 19 is configured to collimate the second optical signals from the optical receiver adapter 3 into parallel optical signals, which may be then incident on the light inlet surface of the first displacement prism 8.

In some examples, the optical demultiplexer 9 is an optical multiplexing assembly based on the thin-film filter technology. The optical demultiplexer 9 may include different films. After the collimated optical signals enter the optical demultiplexer 9, they exit from different films according to their wavelengths. Here, a 4-channel optical demultiplexer is used as an example for description. The 4-channel optical demultiplexer includes a rhomboid prism. An antireflection film and a highly reflective film are coated on a light inlet surface of the rhomboid prism, and four thin-film filters are adhered onto the light outlet surface of the rhomboid prism opposite to the light inlet surface. The working principle is briefly described as follows: optical signals having different wavelengths enter the optical demultiplexer through the antireflection film; the optical signal having the first wavelength exits from the first thin-film filter, and the optical signal having the second wavelength is reflected to the inside of the optical demultiplexer by the first thin-film filter, then reflected by the reflective film, and then exits from the second thin-film filter; the optical signal having the third wavelength exits from the third thin-film filter after two reflections by the first and second thin-film filters; and the optical signal having the fourth wavelength exits from the fourth thin-film filter after three reflections by the first, second and third thin-film filters.

As shown in FIG. 3, in some examples, the optical receiver assembly further includes a reflector 10 disposed on the optical path between the optical receiver array 7 and the optical demultiplexer 9. The optical demultiplexer 9 is configured to separate the second optical signals into second multi-path optical signals, the reflector 10 is configured to reflect the second multi-path optical signals toward the optical receiver array 7, and the optical receiver array 7 is configured to convert the second multi-path optical signals into a plurality of second electrical signals. The optical receiver array 7 may be disposed on the lower surface of the PCB 2, for example. Accordingly, the reflector 10 is provided at the lower surface of the PCB 2 and the reflector 10 has a reflective surface facing the optical receiver array 7. The reflector 10 may be a prism, for example, a 45-degree prism.

As shown in FIG. 3, in some examples, the optical receiver assembly further includes a second displacement prism 13 disposed between the optical demultiplexer 9 and the reflector 10, and the second displacement prism 13 is configured to direct the second multi-path optical signals from the optical demultiplexer 9 toward the reflective surface of the reflector 10. For example, the first displacement prism 8 and the second displacement prism 13 may be rhomboid prisms and made of glass, and the optical signals may be reflected by two opposite surfaces of the prism, thereby playing a role of changing the optical path.

Referring to FIG. 3, the optical demultiplexer 9, the second displacement prism 13 and the reflector 10 are sequentially arranged. The optical demultiplexer 9 is disposed in the second chamber, the second displacement prism 13 and the reflector 10 are disposed in an area below the lower surface of the PCB 2 outside the casing 1, and the light inlet surface and the light outlet surface of the second displacement prism 13 face the light outlet surface of the optical demultiplexer 9 and the light reflective surface of the reflector 10, respectively. The PCB 2 is closer to the first chamber than the second chamber, and the reflector 10 and the optical demultiplexer 9 may not be on a same horizontal plane. In this case, by providing the second displacement prism 13, the optical signals from the light outlet surface of the optical demultiplexer 9 pass through the second displacement prism 13, and then exit in a direction parallel to the incident direction, but the optical signals are closer to the lower surface of the PCB 2.

It can be seen from the above that by being processed by the optical demultiplexer 9, the collimated optical signals are separated into multi-path optical signals having different wavelengths according to their wavelengths, and thus the optical signals entering the second displacement prism 13 may be dispersed and may be not concentrated. In order to allow the optical signals, which will enter the second displacement prism 13, to be converged, in some examples, the optical receiver assembly further includes a first prism 14 arranged between the optical demultiplexer 9 and the second displacement prism 13. The first prism 14 is configured to focus the second multi-path optical signals from the optical demultiplexer 9 to the light inlet surface of the second displacement prism 13.

Figure 5:
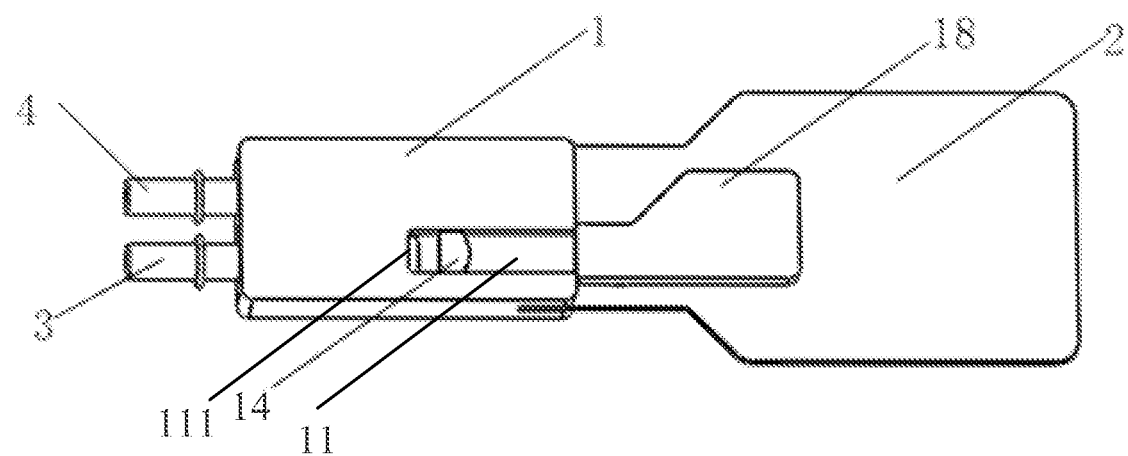
FIG. 5 illustrates a bottom view of a partial structure of an optical module, in accordance with some embodiments.

For example, as shown in FIG. 5, a groove 11 is formed in the bottom surface of the casing 1 and extends toward the inside of the second chamber, and the groove 11 has a bottom and side walls. The first prism 14 is arranged in the groove 11, for example, on the bottom of the groove 11. A first side wall of the groove 11 facing the optical demultiplexer 9 has a third opening 111 through which the second multi-path optical signals from the optical demultiplexer 9 can reach the first prism 14.

In order to make the optical signals from the first prism 14 reach the second displacement prism 13, in some examples, as shown in FIGS. 3 and 5, two side walls of the groove 11 connected to the first side wall extend to the side face of the casing 1 adjacent to the second displacement prism 13, and the optical signals from the first prism 14 reach the second displacement prism 13 directly. In some other examples, a second side wall of the groove 11 facing the second displacement prism 13 has a fourth opening, and the optical signals from the first prism 13 reach the second displacement prism 13 after passing through the fourth opening.

The optical module further includes, for example, a cover disposed on the casing 1 and covering the groove 11 to protect the first prism 14 in the groove 11.

In order to further converge the optical signals to be incident on the reflector 10, in some examples, as shown in FIG. 3, the optical receiver assembly further includes a second prism 15 disposed between the second displacement prism 13 and the reflector 10, and the second prism 15 is disposed in the area below the lower surface of the PCB 2. The second prism 15 is configured to focus the optical signals from the second displacement prism 13, thereby forming a light spot on the reflector 10. The first prism 14 and the second prism 15 are, for example, convex lenses, and are capable of focusing incident light, and the light focusing ability of the second prism 15 is stronger than that of the first prism 14.

In the embodiments, the optical receiver array 7 is disposed on the lower surface of the PCB 2 outside the casing, the light inlet surface of the optical receiver array 7 faces the reflector 10, and the optical receiver array 7 is configured to convert the optical signals into electrical signals.

Figure 6:
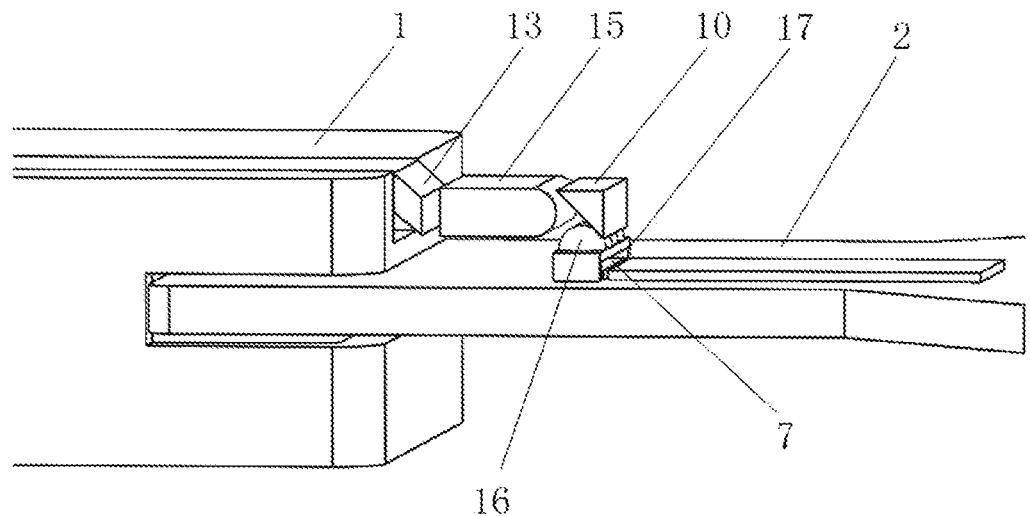
FIG. 6 illustrates an enlarged view of an optical receiver end of an optical module, in accordance with some embodiments.

In some examples, as shown in FIGS. 3 and 6, the optical receiver assembly further includes a silicon lens array 16 disposed between the reflector 10 and the optical receiver array 7. The silicon lens array 16 may be supported above the laser receiver array 7 by a fixed support 17 of the optical receiver assembly, and the light outlet surface of the silicon lens array 16 may face the light inlet surface of the optical receiver array 7. For example, the silicon lens array 16 includes a plurality of silicon lenses and the optical receiver array 7 includes a plurality of optical receiver. Each silicon lens may correspond to a respective one of the plurality of optical receivers, and its light outlet surface may face or even touch the light inlet surface of the optical receiver. The fixed support 17 may have a bench shape or a rectangular shape, and the material thereof may be glass. The silicon lens array 16 is configured to increase energy of the incident optical signals to be incident on the optical receiver array 7.

In some embodiments, as shown in FIG. 7, the second optical signals from the optical receiver adapter 3 pass through the collimating lens 19, the first displacement prism 8, the optical demultiplexer 9, the first prism 14, the second displacement prism 13, the second prism 15, the reflector 10, and the silicon lens array 16 to propagate toward the optical receiver array 7, and are converted into second electrical signals by the optical receiver array 7.

In some embodiments, the optical module further includes an IC controller fixed on the lower surface of the PCB 2 and adjacent to the optical receiver array 7, and the IC controller is electrically connected to the optical receiver array 7 and is configured to receive the second electrical signals from the optical receiver array 7. That is, the optical receiver array 7 receives the second optical signals from the silicon lens array 16, converts the second optical signals into second electrical signals, and transmits the second electrical signals to the IC controller.

As mentioned earlier in the embodiments, the second displacement prism 13 and the reflector 10 are not on the same horizontal plane as the optical demultiplexer 9. In some other embodiments, as shown in FIG. 5, the optical module further includes a receiver end cover 18 connected to a surface of the PCB 2 facing the second displacement prism 13 and the reflector 16. The second displacement prism 13 and the reflector 10 are fixed on a surface of the receiver end cover 18 facing the PCB 2, and the second prism 15 is also fixed on the surface of the receiver end cover 18 between the second displacement prism 13 and the reflector 10. In the embodiments, the silicon lens array 16 is disposed between the reflector 10 and the optical receiver array 7. The receiver end cover 18 can protect the optical components such as the second displacement prism 13, the reflector 10, the optical receiver array 7, the second prism 15, and the silicon lens array 16, and can also help to realize the best coupling state of the receiver end components in the optical module.

Since the laser array 5 and the optical multiplexer 6 at the light transmitter end are arranged in the casing 1 and correspond to the upper surface area of the PCB 2, and the received optical signals propagate toward the lower surface of the PCB 2 through the first displacement prism 8, the components at the receiver end and the components at the transmitter end can be located on different sides of the PCB 2. When the optical module works, crosstalk between the components at the receiver end and the transmitter end does not occur, and the above arrangement may fully utilize the space of the casing and improve the space utilization.

In some other embodiments of the present disclosure, another optical module is provided, which is similar to the optical module provided in any embodiment described above in structure. The difference between the two is mainly that the optical module in these embodiments includes a ceramic substrate and flexible circuit boards. In addition, the position relationship between the components and the casing of the optical modules may be different. It will be noted that with regard to the similarities between the different embodiments herein, reference can be made to the relevant parts of other embodiments, and details will not be described. The differences between the different embodiments are mainly described below.

Figure 8:
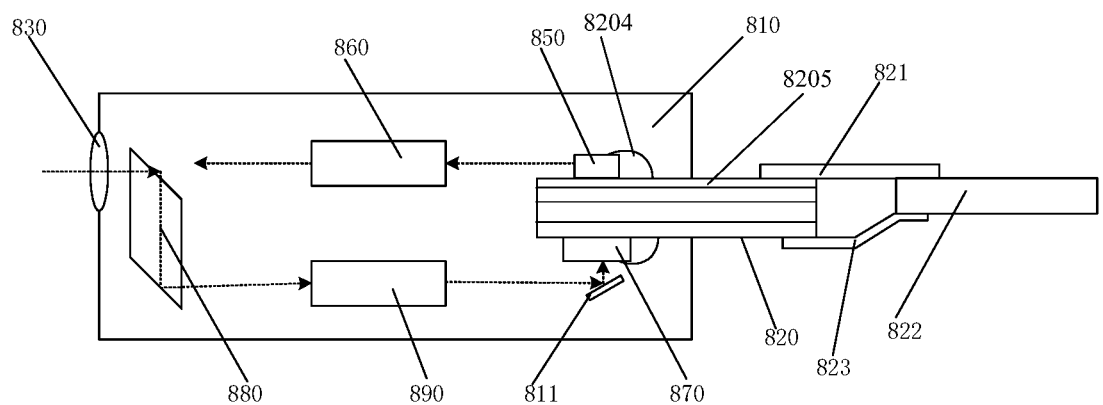
FIG. 8 illustrates a sectional view of a partial structure of an optical module, in accordance with some embodiments.
Figure 9:
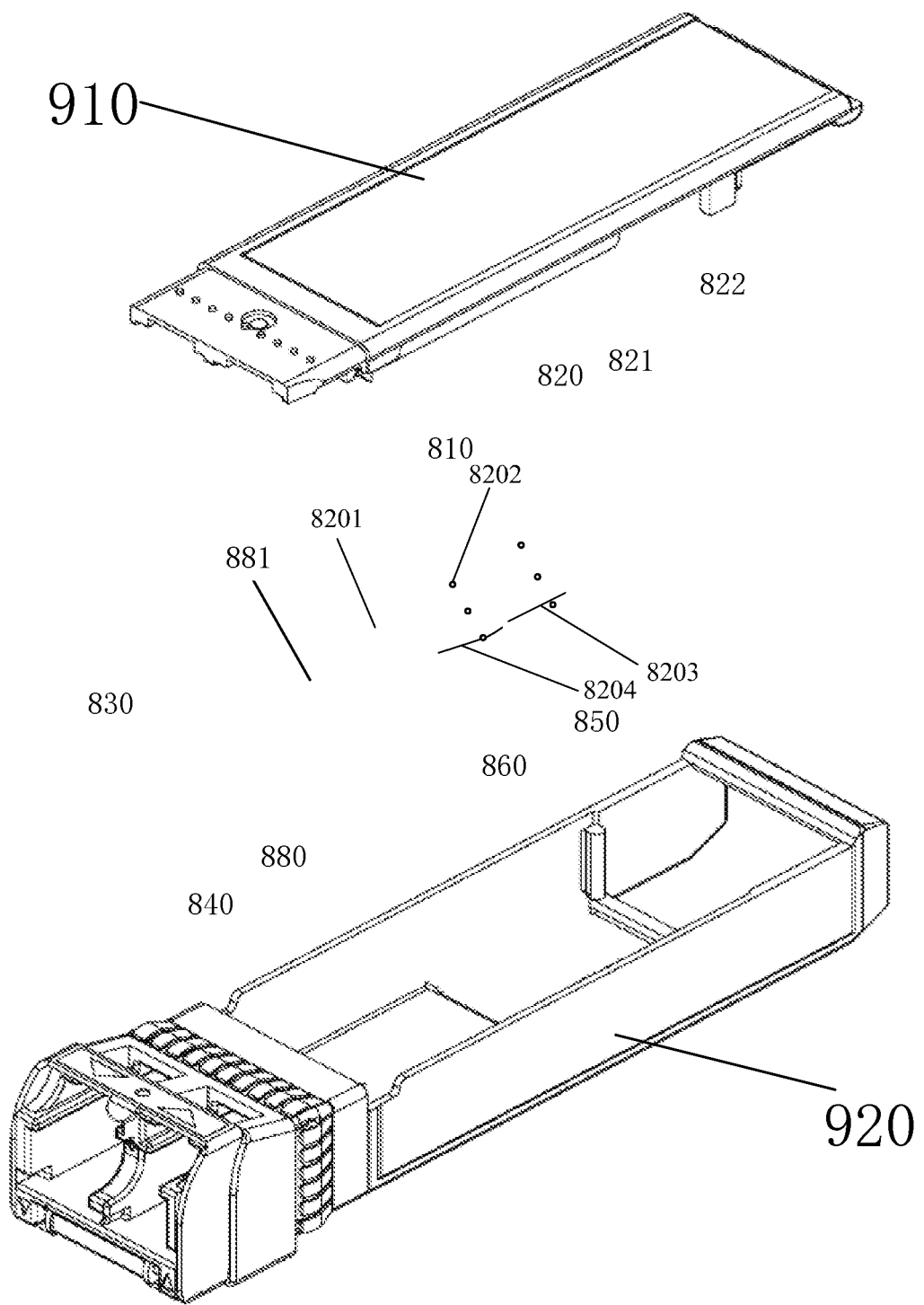
FIG. 9 illustrates an exploded view of an optical module, in accordance with some embodiments.

As shown in FIGS. 8 and 9, the optical module includes a casing 810, a ceramic substrate 820, a PCB 822, and flexible circuit boards 821 and 823. One end of the ceramic substrate 820 extends into the casing 810, and an opposite end of the ceramic substrate 820 is located outside the casing 810. The opposite end of the ceramic substrate 820 is electrically connected to the PCB 822 through the flexible circuit boards 821 and 823.

For example, as shown in FIGS. 8 and 9, one side of the casing 810 is provided with the optical transmitter adapter 840 for outputting the first optical signals, and the optical receiver adapter 830 for receiving second optical signals. The first displacement prism 880, the optical multiplexer 860, the optical demultiplexer 890, the reflector 811, the laser array 850 and the optical receiver array 870 are arranged in the casing 810. The laser array 850 is disposed on the upper surface of the ceramic substrate 820, and the optical receiver array 870 is disposed on the lower surface of the ceramic substrate 820. The first optical signals emitted by the laser array 850 are combined by the optical multiplexer 860 and then output through the optical transmitter adapter 840. The first displacement prism 880 is configured to direct the second optical signals from the optical receiver adapter 830 toward the optical demultiplexer 890. The optical demultiplexer 890 is configured to separate the second optical signals from the first displacement prism 880 into second multi-path optical signals. The reflector 811 is configured to reflect the second multi-path optical signals from the optical demultiplexer 890 toward the optical receiver array 870. The optical receiver array 870 is configured to convert the second multi-path optical signals from the reflector 811 into second electrical signals.

The optical receiver array 870 is disposed on the lower surface of the ceramic substrate 820, and the laser array 850 is disposed on the upper surface of the ceramic substrate 820. In this way, the space for arranging devices may be increased and interference between the laser array 850 and the optical receiver array 870 may be avoided. The first displacement prism 880 directs the optical signals from the optical receiver adapter 830 to the optical demultiplexer 890, and the optical demultiplexer 890 realizes the separation of the optical signals. The reflector 811 realizes the propagation of the optical signals toward the optical receiver array 870, so that the optical receiver array 870 receives the optical signals. The multi-path optical signals from the laser array 850 are combined by the optical multiplexer 860, and exit through the optical transmitter adapter 840. The ceramic substrate 820 realizes the electrical connection between components inside and outside of the casing 810, and meets the requirements of hermetic packaging. For example, the ceramic substrate 820 has circuit traces or wires arranged thereon to realize the electrical connection. The ceramic substrate 820 is electrically connected to the PCB 822 through the flexible circuit boards 821 and 823, and electronic components on the PCB 822 may supply power to components on the ceramic substrate 820.

Referring to FIG. 8, the optical module provided by the embodiments of the present disclosure includes the casing 810 and the ceramic substrate 820. One end of the ceramic substrate 820 extends into the casing 810, and the other end of the ceramic substrate 820 is located outside the casing 810. The casing 810 is divided by the one end of the ceramic substrate 820 into a third chamber and a fourth chamber. For example, as shown in FIG. 8, the one end of the ceramic substrate 820 does not reach the first side wall of the casing 810. For another example, the one end of the ceramic substrate 820 reach the first side wall of the casing 810. In this case, a fifth opening is provided in the one end of the ceramic substrate 820 at the first side wall, and the first displacement prism 880 extends from the third chamber to the fourth chamber through the fifth opening.

Referring to FIG. 9, in some embodiments, the optical module further includes a phosphorus nitride plate 8201. One end of the phosphorus nitride plate 8201 is connected to the ceramic substrate 820, and an opposite end of the phosphorus nitride plate 8201 extends to the first side wall of the casing 810 to divide the casing 810 into two chambers. In this case, a sixth opening is provided in the opposite end of the phosphorus nitride plate 8201 at the first side wall, and the first displacement prism 880 extends from one chamber to another through the sixth opening. The one end of the phosphorus nitride plate 8201 may be adhered to the ceramic substrate 820, or connected to the ceramic substrate 820 in other ways. The upper surfaces of the phosphorus nitride plate 8201 and the ceramic substrate 820 may be in a same plane, and the lower surfaces of the phosphorus nitride plate 8201 and the ceramic substrate 820 may be in a same plane.

It will be noted that although the above embodiments are described by taking an example in which the laser array 850 and the optical receiver array 870 are disposed on the ceramic substrate 820, as shown in FIG. 9, the laser array 850 and the optical receiver array 870 may also be disposed on the upper surface and the lower surface of the phosphorus nitride plate 8201, respectively, and are connected to corresponding circuit traces 8203 of the ceramic substrate 820 through respective wires 8204.

The upper and lower surfaces of the ceramic substrate 820 are provided with optical components, i.e., optical devices, thereon, and the upper and lower surfaces of the ceramic substrate 820 are used for supporting the optical components. For example, an upper surface of a portion of the ceramic substrate extending into the casing 810 is provided with the laser array 850 thereon and its lower surface is provided with the optical receiver array 870 thereon. The laser array 850 is configured to emit multi-path optical signals with different wavelengths. The laser array 850 may be electrically connected to electronic components on the upper surface of the ceramic substrate 820 by wires, and the electronic components on the upper surface of the ceramic substrate 820 may be electrically connected to the electronic components outside the casing by circuit traces. The optical receiver array 870 is configured to receive multi-path optical signals with different wavelengths, and each of the optical signals may correspond to a receiver in the optical receiver array 870. The receivers may be electrically connected to electronic components on the lower surface of the ceramic substrate 820 by wires, and the electronic components on the lower surface of the ceramic substrate 820 may be electrically connected to the electronic components outside the casing. For example, the electronic components on the upper and lower surfaces of the ceramic substrate 820 outside the casing are electrically connected to the electronic components on the PCB 822 through the flexible circuit boards 821 and 823, respectively. The PCB 822 is located outside the casing 810.

In some examples, the ceramic substrate 820 has a multilayer structure. For example, as shown in FIGS. 8 and 9, the ceramic substrate 820 includes a plurality of base substrates 8205 stacked and wires or circuit traces 8203 that are provided between two adjacent base substrates 8205 and provided on two outermost opposite surfaces of the ceramic substrate 820. The laser array 850 and the optical receiver array 870 are connected to corresponding circuit traces 8203 through respective wires 8204. In addition, the wires or circuit traces 8203 may be connected through via holes 8202 passing through the plurality of base substrates 8205.

The upper surface of the ceramic substrate 820 is electrically connected to the upper surface of the PCB 822 through the flexible circuit board 821, and the lower surface of the ceramic substrate 820 is electrically connected to the lower surface of the PCB 822 through the flexible circuit board 823. The upper surface of the ceramic substrate 820 is the upper surface of the entire multilayer substrate, and the lower surface of the ceramic substrate 820 is the lower surface of the entire multilayer substrate.

In some examples, as shown in FIG. 9, one side of the casing 810 is provided with the optical transmitter adapter 840 and the optical receiver adapter 830, which respectively transmit optical signals and receive optical signals through respective adjusting sleeves. The two adapters are arranged at the same height relative to the lower surface of the casing 810 to match the external optical fiber connectors respectively. With regard to the arrangements of the optical receiver adapter 830 and the optical transmitter adapter 840, reference may be made to the descriptions of the optical receiver adapter 3 and the optical transmitter adapter 4 in the foregoing embodiments, which will not be repeated here.

In this case, with respect to the lower surface of the casing 810, the transmitted optical signals and the received optical signals are on the same plane. For example, the direction in which the optical signals from the laser array 850 propagate is the same as the direction in which the light is incident onto the optical receiver adapter 830. If the optical path of the optical signals from the optical receiver adapter 830 to the casing 810 is not changed, the optical signals will propagate toward the laser array 850. In order to prevent the optical signals from the optical receiver adapter 830 from propagating toward the laser array 850, the first displacement prism 880 is provided for directing the optical signals toward the lower surface of the ceramic substrate 820, so as to direct the optical signals from the optical receiver adapter 830 to the optical receiver array 870.

Similar to the embodiments shown in FIG. 4, as shown in FIG. 9, the first displacement prism 880 is fixedly arranged in the fifth opening 881. For example, a light inlet surface of the first displacement prism 880 faces a light outlet end of the optical receiver adapter 830, and a light outlet surface of the first displacement prism 880 faces a light inlet surface of the optical demultiplexer 890. The optical signals exit the light outlet surface of the first displacement prism 880 after passing through the first displacement prism 880 and are incident onto the light inlet surface of the optical demultiplexer 890. With regard to the first displacement prism 880, reference may be made to the first displacement prism 8 in FIG. 4, which will not be repeated here.

The optical signals from the optical receiver adapter 830 are optical signals with different wavelengths. After the optical signals pass through the first displacement prism 880, the optical demultiplexer 890 separates the optical signals into multi-path optical signals each having wavelengths in a preset wavelength range. The preset wavelength range can be set according to actual needs or the corresponding channel of the optical demultiplexer 890. With regard to the optical demultiplexer 890, reference may be made to the related description of the optical demultiplexer 9 in the foregoing embodiments, and details will not described here.

The light inlet surface of the optical receiver array 870 may be perpendicular to the propagation direction of the optical signals passing through the optical demultiplexer 890, and the reflector 811 provided in the casing 810 may change the propagation direction of the optical signals so that the optical signals can enter the optical receiver array 870. The reflector 811 may be a mirror or a plastic body with a reflective surface.

As shown in FIGS. 8 and 9, in some embodiments, the optical module further includes an upper housing 910 and a lower housing 920 that are assembled to form a chamber, and the casing 810, the ceramic substrate 820, the flexible circuit board 821, the flexible circuit board 823 and the PCB 822 are arranged in the chamber. The upper housing 910 and the lower housing 920 are the housing of the entire optical module, and the casing 810 is used to encapsulate the laser array 850 and the optical receiver array 870 and other devices in the optical module. The casing 810 is located in the housing of the optical module. The functions and structures of the outer housing 910 and 920 and the casing 810 are different. It will be noted that this structure may also be suitable for the optical module shown in FIGS. 3 to 7. That is, the casing 1 and the PCB 2 are arranged in the chamber of the outer housing of the optical module.

In some examples, the flexible circuit boards 821 and 823 are made of flexible materials and can be bent, while the PCB 822 is made of a rigid material and cannot be bent.

The PCB 822 is configured to carry electronic devices such as the MCU, resistors and capacitors. The electronic devices on the PCB 822 transmit the electrical signals to be converted to the laser array 850 in the casing 810, and a driving chip of each laser of the laser array 850 drives a laser chip of the laser to emit light according to a corresponding electrical signal to realize the conversion of the electrical signal into the optical signal. In addition, electronic devices on the PCB 822 transmit the electrical signals converted from the optical signals by the optical receiver array 870 to an external host computer. For example, the optical receiver array 870 convers received optical signals into photocurrent, which is then converted into digital electrical signals through a transimpedance amplifier and a limiting amplifier on the lower surface of the ceramic substrate 820. Then the digital electrical signals are output to the external host computer through a gold finger of the PCB 822. It will be noted that the above process may be also suitable for the laser array 5 and the optical receiver array 7 described above.

The multi-path optical signals from the optical receiver adapter 830 may be dispersed, and thus a collimating lens is provided between the optical receiver adapter 830 and the first displacement prism 880. With regard to the collimating lens, reference may be made to the collimating lens 19 in FIG. 7, and details will not be described.

In the embodiments, the optical receiver array 870 is disposed on the lower surface of the ceramic substrate 820, and a reflector 811 is disposed in the area below the lower surface of the ceramic substrate 820. The reflector 811 reflects the optical signals from the optical demultiplexer 890 toward the optical receiver array 870.

Figure 10:
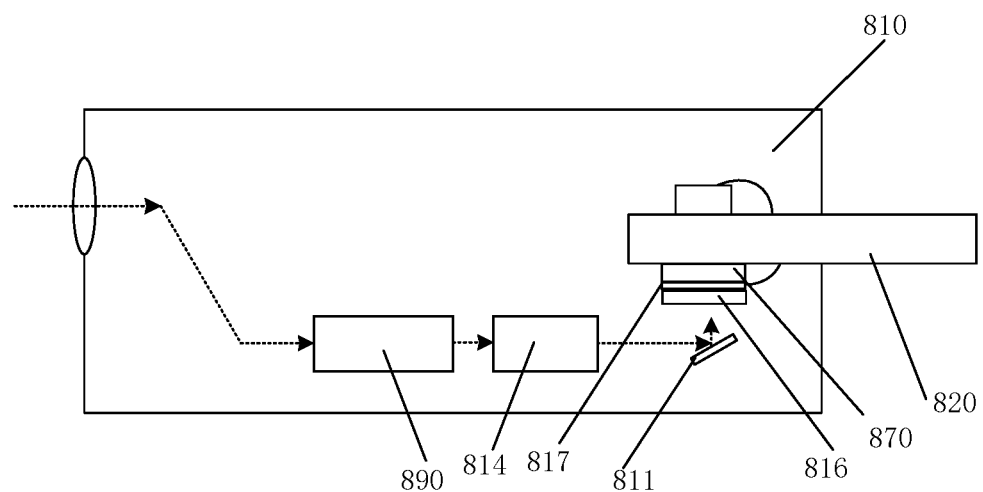
FIG. 10 illustrates a schematic diagram of a partial structure of an optical receiver assembly of an optical module, in accordance with some embodiments.

Referring to FIG. 10, it can be seen from the above that, the optical demultiplexer 890 is configured to separate the collimated optical signals into multi-path optical signals having different wavelengths according to their wavelengths, and transmit the multi-path optical signals to the reflector 811. However, the optical signals entering the second displacement prism 811 may be dispersed and be not concentrated. In order to converge the optical signals entering the reflector 811, the first prism 814 is provided between the optical demultiplexer 890 and the reflector 811. With regard to the setting of the first prism 814, reference may be made to the first prism 14 in the foregoing embodiments, and details will not be described here.

In the embodiments, the optical receiver array 870 is disposed on the lower surface of the PCB 820 inside the casing, the light inlet surface of the optical receiver array 870 faces the reflector 811, and the optical receiver array 870 is configured to receive the incident optical signals. In the embodiments, a silicon lens array 816 is disposed between the reflector 811 and the optical receiver array 870. The silicon lens array 816 is attached to the light inlet surface of the optical receiver array 870 via a fixed support 817. The silicon lens array 816 can increase the energy of optical signals incident on the optical receiver array 870. With regard to the silicon lens array 816 and the fixed support 817, reference may be made to the silicon lens array 16 and the fixed support 17 described above, and details will not be described here.

In some embodiments, the optical module further includes a transimpedance amplifier. The transimpedance amplifier is disposed on the lower surface of the ceramic substrate 820 in the casing 810 and adjacent to the optical receiver array 870. The transimpedance amplifier is electrically connected to the optical receiver array 870. The optical signals reflected from the reflector 811 pass through the silicon lens array 816 and enter the optical receiver array 870. After the optical signals are coupled in the optical receiver array 870, they are converted into electrical signals (such as photocurrent) by the optical receiver array 870. The optical receiver array 870 outputs the electrical signals to the transimpedance amplifier for signal differential and amplification processing. The transimpedance amplifier is electrically connected to wires or circuit traces on the lower surface of the ceramic substrate 820.

It will be noted that, for the same components in the embodiments shown in FIGS. 8 to 10 as in the embodiments shown in FIGS. 3 to 7, reference may be made to the embodiments shown in FIGS. 3 to 7, and details will not be described here.

In some embodiments, the optical module may further include a processor and a memory. The memory stores executable instruction codes that, when executed by the processor, control the components in the optical module to perform respective operations.

The processor usually controls the overall operation of the optical module, such as signal processing and signal output. The processor may be a general-purpose processor, for example, a central processing unit (CPU), a network processor (NP) or a combination of CPU and NP. The processor may also be a Micro Controller Unit (MCU). The processor may also include a hardware chip. The hardware chip may be an application specific integrated circuit (ASIC), a programmable logic device (PLD), or a combination thereof. The PLD may be Complex Programmable Logic Device (CPLD), Field Programmable Gate Array (FPGA) or the like.

The memory can be any types of volatile or non-volatile storage devices, or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or an compact disk.

In some embodiments, the optical module may further include a micro power supply component, a communication interface, and a communication component. The micro power supply component is configured to provide power for various electronic components of the optical module. The micro power supply component may include a power supply management system, one or more power supplies, and other assemblies for generating, managing and allocating power for the optical module.

The communication interface is an interface provided between the component of the optical module and a peripheral interface module. The peripheral interface module can be a keyboard, a click wheel, a button or the like.

The communication component is configured to perform the wired or wireless communication between the optical module and other devices. The optical module can access a communication standard based wireless network, such as WiFi, 2G or 3G, or a combination thereof. In an exemplary embodiment, the communication component receives a broadcast signal or broadcast related information from an external broadcast management system via a broadcast channel. In an exemplary embodiment, the communication component further includes a near field communication (NFC) module for promoting short range communication. For example, the NFC module can be realized on the basis of a radio frequency identification (RFID) technology, an infrared data association (IrDA) technology, an ultrawide band (UWB) technology, a Bluetooth (BT) technology or other technologies.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. An optical module, comprising:
   a casing;
   a printed circuit board (PCB) connected to a first side wall of the casing and configured to provide a plurality of first electrical signals to an optical transmitter assembly;
   the optical transmitter assembly disposed in the casing and configured to convert the plurality of first electrical signals into first optical signals;
   an optical receiver adapter and an optical transmitter adapter arranged outside the casing and connected to a second side wall of the casing, wherein the optical transmitter adapter is configured to output the first optical signals, and the optical receiver adapter is configured to receive second optical signals;
   a first displacement prism disposed in the casing and configured to direct the second optical signals toward a component of an optical receiver assembly;
   the optical receiver assembly, of which at least one component including the component is disposed in the casing, wherein the optical receiver assembly is configured to convert the second optical signals into a plurality of second electrical signals; and a partition disposed in the casing, wherein the partition is configured to divide a space in the casing into a first chamber and a second chamber, wherein the optical transmitter assembly is disposed in the first chamber, the at least one component of the optical receiver assembly is disposed in the second chamber, and the optical receiver adapter and the optical transmitter adapter are connected to the second side wall at positions corresponding to the first chamber; and the partition includes a first opening communicating with the first chamber and the second chamber, and the first displacement prism extends from the first chamber to the second chamber through the first opening.

2. The optical module according to claim 1, wherein the first side wall of the casing has a second opening, one end of the PCB extends into the first chamber through the second opening, and an opposite end of the PCB is located outside the casing.

3. The optical module according to claim 1, wherein a plane where an intersection of a central axis of the optical receiver adapter and the second side wall of the casing and an intersection of a central axis of the optical transmitter adapter and the second side wall of the casing are located is parallel to a plane where the PCB is located.

4. The optical module according to claim 1, wherein the optical transmitter assembly includes:

a laser array electrically connected to the PCB and configured to convert the plurality of the first electrical signals into first multi-path optical signals; and an optical multiplexer configured to combine the first multi-path optical signals to form the first optical signals.

5. The optical module according to claim 1, wherein the optical receiver assembly includes:

an optical demultiplexer arranged in the casing and configured to separate the second optical signals into second multi-path optical signals;

a reflector configured to reflect the second multi-path optical signals to an optical receiver array; and the optical receiver array configured to convert the second multi-path optical signals into the plurality of the second electrical signals.

6. The optical module according to claim 5, wherein the reflector and the optical receiver array are located outside the casing, and the optical receiver array is disposed on a surface of the PCB facing away from the optical transmitter assembly.

7. The optical module according to claim 5, wherein the optical receiver assembly further includes a second displacement prism disposed between the optical demultiplexer and the reflector, wherein the second displacement prism is configured to direct the second multi-path optical signals from the optical demultiplexer toward the reflector.

8. The optical module according to claim 7, wherein the optical receiver assembly further includes a first prism disposed between the optical demultiplexer and the second displacement prism, wherein the first prism is configured to focus the second multi-path optical signals from the optical demultiplexer to a light inlet surface of the second displacement prism.

9. The optical module according to claim 8, wherein a groove is disposed in a surface of the casing provided with the optical demultiplexer and extends toward the inside of the casing, the first prism is arranged in the groove, and a side wall of the groove facing the optical demultiplexer has a third opening.

10. The optical module according to claim 8, wherein the optical receiver assembly further includes a second prism disposed between the second displacement prism and the reflector, wherein the second prism is configured to focus optical signals from the second displacement prism to the reflector.

11. The optical module according to claim 10, wherein the optical receiver assembly further includes a silicon lens array disposed between the reflector and the optical receiver array and a fixed support configured to support the silicon lens array, so that a light outlet surface of the silicon lens array faces a light inlet surface of the optical receiver array.

12. The optical module according to claim 7, further comprising a receiver end cover connected to a surface of the PCB facing the second displacement prism and the reflector, wherein the second displacement prism and the reflector are located outside the casing and fixed on a surface of the receiver end cover facing the PCB.

13. The optical module according to claim 1, further comprising a collimating lens disposed between the optical receiver adapter and the first displacement prism, wherein the collimating lens is embedded in the second side wall of the casing and configured to collimate the second optical signals from the optical receiver adapter into parallel optical signals to be incident on a light inlet surface of the first displacement prism.

14. An optical module, comprising: a casing; a partition disposed in the casing; an optical transmitter adapter connected to a side wall of the casing and configured to output a first optical signal; an optical receiver adapter connected to the side wall of the casing and configured to receive a second optical signal; an optical transmitter assembly disposed at a first side of the partition in the casing and configured to convert a first electrical signal into the first optical signal; a prism disposed in the casing and configured to direct the second optical signal from the first side of the partition to a second side of the partition opposing the first side; an optical receiver assembly configured to receive the second optical signal from the prism and to convert the second optical signal into a second electrical signal, and including at least one component disposed at the second side of the partition in the casing; and a circuit board, extending through another side wall of the casing, configured to provide the first electrical signal to the optical transmitter assembly and to receive the second electrical signal from the optical receiver assembly.

15. An optical module, comprising:

a casing;

a printed circuit board (PCB) connected to a first side wall of the casing and configured to provide a plurality of first electrical signals to an optical transmitter assembly;

the optical transmitter assembly disposed in the casing and configured to convert the plurality of first electrical signals into first optical signals;

an optical receiver adapter and an optical transmitter adapter arranged outside the casing and connected to a second side wall of the casing, wherein the optical transmitter adapter is configured to output the first optical signals, and the optical receiver adapter is configured to receive second optical signals;

a first displacement prism disposed in the casing and configured to direct the second optical signals toward a component of an optical receiver assembly;

the optical receiver assembly, of which at least one component including the component is disposed in the casing, wherein the optical receiver assembly is configured to convert the second optical signals into a plurality of second electrical signals;

a ceramic substrate, wherein one end of the ceramic substrate extends into the casing, and an opposite end of the ceramic substrate is located outside the casing; and flexible circuit boards, wherein the opposite end of the ceramic substrate is connected to the PCB through the flexible circuit boards, wherein at least one component of the optical transmitter assembly is located on a surface of the ceramic substrate, and the at least one component of the optical receiver assembly is located on an opposite surface of the ceramic substrate.

16. The optical module according to claim 15, wherein the one end of the ceramic substrate is configured to divide a space in the casing into a third chamber and a fourth chamber, the optical transmitter assembly is disposed in the third chamber, the at least one component of the optical receiver assembly is disposed in the fourth chamber, and the first displacement prism extends from the third chamber to the fourth chamber.

17. The optical module according to claim 15, wherein the ceramic substrate includes a plurality of base substrates stacked and a plurality of circuit traces disposed on the plurality of base substrates, and the plurality of circuit traces are electrically connected through via holes extending through the plurality of base substrates.

18. The optical module according to claim 15, wherein a plane where an intersection of a central axis of the optical receiver adapter and the second side wall of the casing and an intersection of a central axis of the optical transmitter adapter and the second side wall of the casing are located is parallel to the surface of the ceramic substrate where the at least one component of the optical transmitter assembly is located.

* * * * *